No. 692,420. Patented Feb. 4, 1902.
W. S. BRYANT.
WAVE MOTOR.
(Application filed July 23, 1900.)
(No Model.)
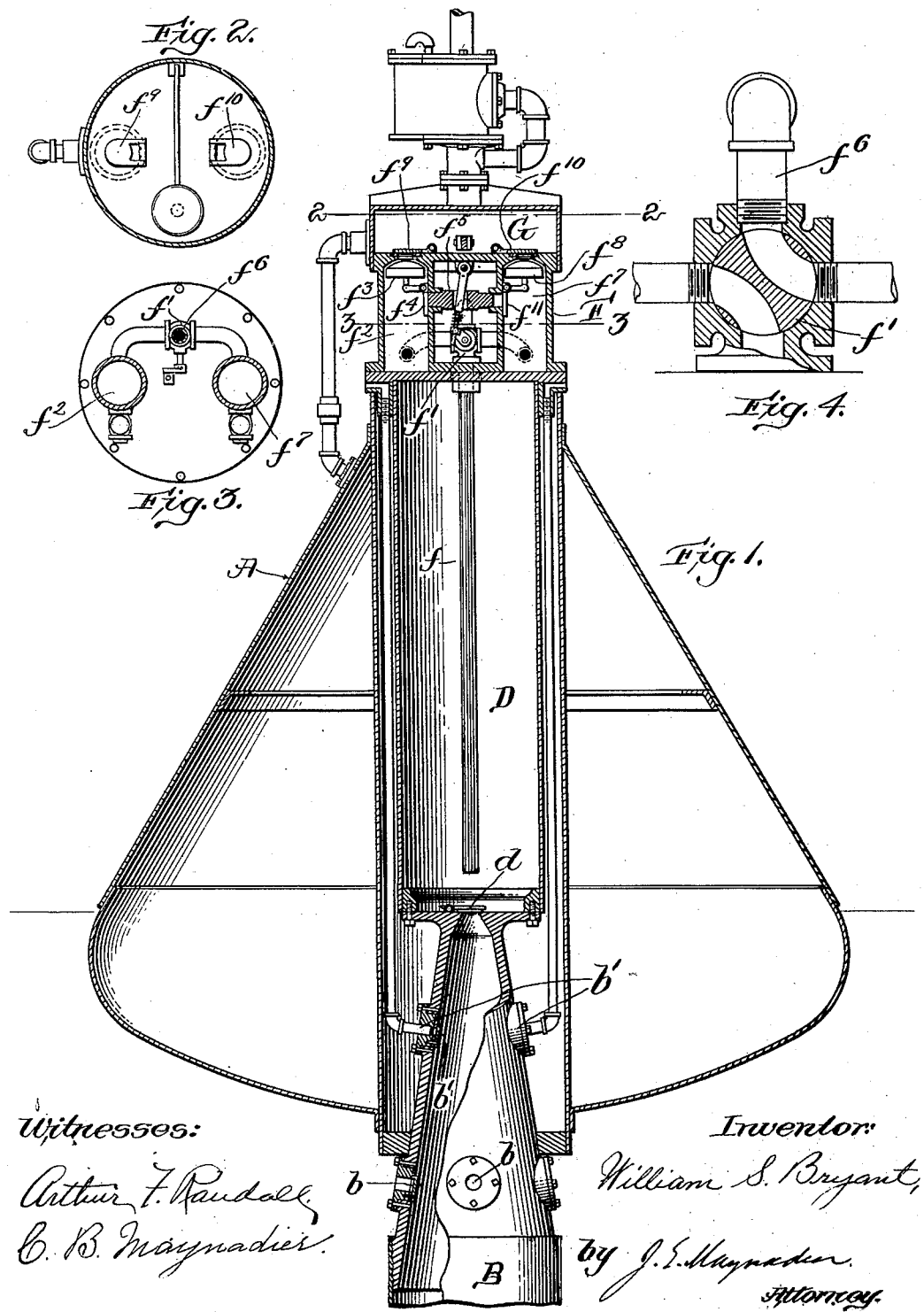

UNITED STATES PATENT OFFICE.

WILLIAM S. BRYANT, OF COHASSET, MASSACHUSETTS.

WAVE-MOTOR.

SPECIFICATION forming part of Letters Patent No. 692,420, dated February 4, 1902.

Application filed July 23, 1900. Serial No. 24,475. (No model.)

*To all whom it may concern:*

Be it known that I, WILLIAM S. BRYANT, of Cohasset, in the county of Norfolk and State of Massachusetts, have invented a new and useful Wave-Motor, of which the following is a specification, reference being had to the accompanying drawings, in which—

Figure 1 is a central vertical section of a wave-motor, illustrating one form of my invention. Fig. 2 is a section on line 2 2 of Fig. 1. Fig. 3 is a section on line 3 3 of Fig. 1. Fig. 4 is a detail described below.

My invention is a float provided with a long tube, a pressure-reservoir at the upper end of the tube, and valves, all so organized that the rising and falling of the float caused by waves shall force water and air into the pressure-reservoir, and thereby compress air in that reservoir and supply a flow of water and air under pressure from the reservoir.

In the drawings, A is the float, (shown as a buoy,) and B the tube, open at its lower end and connected at its upper end to the reservoir D. Tube B carries valves $b$, through which water flows into tube B when float A is lifted by a wave; but on the fall of float A the water which has flowed into tube B through valves $b$ cannot escape except by passing downward and out at the lower end of tube B or else by passing upward through valve $d$ into reservoir D. The column of water inside the tube B is in practice almost stationary during the rising and falling of the buoy, since the tube dips into the still water below. The top position of that column thereby forms a water-piston working in a cylinder, which is tube B. This piston acts to draw in a supply of water and air through the valves $b$ and $b'$ and force the same under pressure into the receiver, although the tube B is open at the bottom all the time, for the reason that, the tube being very long, the inertia of the water therein is so great that it does not have time to move appreciably during the movements of the buoy. It is therefore plain that if the tube B were made long enough the whole weight of the buoy might be made effective to compress the air into the reservoir D; but whether this be the true theory or not it is a fact that water and air from tube B rush up through valve $d$ into reservoir D, the air being compressed above the water in that reservoir.

The water from reservoir D is forced by the compressed air above it to flow through pipe $f$ to apparatus F for utilizing water under pressure.

I have shown the apparatus F as an air-compressor supplying air-reservoir G, piped to interior of buoy A, the energy thus stored in G and A being utilized as described in my Patent No. 666,259, dated January 22, 1901, as indicated in the extreme upper end of Fig. 1; but it will be obvious, of course, that my present invention is not in any way restricted as to the form of apparatus for utilizing the outflow of water mixed with compressed air from reservoir D.

The valves $b'$ are air-inlet valves for supplying enough air to reservoir D to take the place of the compressed air which escapes with the outflowing water, for in practical operation the water-level rises rapidly in reservoir D until the air compressed in reservoir D above the water-level attains a pressure sufficient to force water, mixed, of course, with some compressed air, through pipe $f$ and valve $f'$ into cylinder $f^2$ of apparatus F. When cylinder $f^2$ is nearly filled with water, float $f^3$ is lifted, opening valve $f^4$ and shifting plunger $f^5$ by reason of water flowing through valve $f^4$ into the cylinder, in which one end of plunger $f^5$ acts as a piston, which shifts valve $f'$, shutting off cylinder $f^2$ from pipe $f$ and opening cylinder $f^2$ to exhaust-pipe $f^6$, and also opening cylinder $f^7$ to pipe $f$, when water flows through pipe $f$ and valve $f'$ into cylinder $f^7$, operating float $f^8$ to open valve $f^{11}$ and shift plunger $f^5$ back to its first position, when the operation is repeated, thus forcing air past check-valve $f^9$ or $f^{10}$ into reservoir G. The water will gradually accumulate in reservoir G until it lifts a float in that reservoir, and thereby opens a small valve controlled by that float, when it will escape, and the float will fall and the valve will close, all in a well-known manner; but as air is continuously forced into reservoir D with water from tube B the water-level in reservoir D must eventually fall to near the mouth of pipe $f$, and in that condition the compressed air above the water-level will first force water up through pipe $f$, and thereby bring the water on a level with or slightly below the mouth of pipe $f$, and compressed air will rush up through pipe $f$ into one of the cylinders $f^2$ or $f^7$; but then the compressed air will, if its pressure be sufficient, lift check-valve $f^9$ or $f^{10}$ and flow into reservoir G; but if the pressure of the compressed air at any time in either cylinder $f^2$ or $f^7$ be less than the pressure in G the water-level will rise in D, and the air-pressure in D will increase until more water is forced up through pipe $f$ or until the air-pressure in the cylinder $f^2$ or $f^7$ be otherwise made greater than the pressure in G.

What I claim as my invention is—

In combination a tube open at its lower end, and provided with water-inlet valves; a reservoir connected with the upper end of the tube; a valve opening out of the tube and into the reservoir; a float carrying the tube with its open lower end well below the surface of the water which sustains the float; and a pipe leading from the reservoir and serving as an outflow for the water forced into the reservoir by the motion of the float caused by waves.

WILLIAM S. BRYANT.

Witnesses:
J. E. MAYNADIER,
ARTHUR F. RANDALL.